US011778277B1

(12) United States Patent
Bryan et al.

(10) Patent No.: US 11,778,277 B1
(45) Date of Patent: Oct. 3, 2023

(54) DIGITAL ITEM PROCESSING FOR VIDEO STREAMS

(71) Applicant: Amazon Technologies, Inc., Seattle, WA (US)

(72) Inventors: Tony Norman Bryan, Lake Forest Park, WA (US); Paul Martin, Seattle, WA (US); Brent Allen Colson, Seattle, WA (US); Samuel Leiber, Fairfax, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/345,264

(22) Filed: Jun. 11, 2021

(51) Int. Cl.
| | | |
|---|---|---|
| *H04N 5/445* | (2011.01) | |
| *G06F 13/00* | (2006.01) | |
| *G06F 3/00* | (2006.01) | |
| *H04N 21/478* | (2011.01) | |
| *G06N 20/00* | (2019.01) | |
| *G10L 15/22* | (2006.01) | |
| *G06F 16/783* | (2019.01) | |
| *G06F 16/78* | (2019.01) | |
| *H04N 21/422* | (2011.01) | |
| *H04N 21/44* | (2011.01) | |

(52) U.S. Cl.
CPC ..... *H04N 21/47815* (2013.01); *G06F 16/785* (2019.01); *G06F 16/7837* (2019.01); *G06F 16/7854* (2019.01); *G06F 16/7867* (2019.01); *G06N 20/00* (2019.01); *G10L 15/22* (2013.01); *H04N 21/42203* (2013.01); *H04N 21/44008* (2013.01); *G10L 2015/223* (2013.01)

(58) Field of Classification Search
CPC ....... H04N 21/47815; H04N 21/42203; H04N 21/44008; G06F 16/7837; G06F 16/785; G06F 16/7854; G06F 16/7867
See application file for complete search history.

(56) References Cited

U.S. PATENT DOCUMENTS

| | | | | |
|---|---|---|---|---|
| 2012/0167145 | A1* | 6/2012 | Incorvia | H04N 21/812 |
| | | | | 725/60 |
| 2013/0151339 | A1* | 6/2013 | Kim | G06Q 30/02 |
| | | | | 705/14.55 |
| 2016/0180467 | A1* | 6/2016 | Griffin | G06F 16/7837 |
| | | | | 705/4 |
| 2019/0179607 | A1* | 6/2019 | Thangarathnam | ........................ |
| | | | | G10L 15/1815 |

* cited by examiner

*Primary Examiner* — Gigi L Dubasky
(74) *Attorney, Agent, or Firm* — Lee & Hayes, P.C.

(57) ABSTRACT

A voice-enabled device and a display device may be utilized to determine items in video output by the display device. A frame of a video stream associated with the video may be utilized to determine a representation of a candidate object. A stream identifier and a timestamp associated with the candidate object in the video stream may be determined. The stream identifier, the timestamp, and an object identifier associated with the candidate object may be stored in a database. A first request to output the video stream via a display device may be received. A second request associated with the video stream may be received while the video stream is being output by the display device. The second request may be determined to be associated with the representation of the candidate object. The object identifier may be caused to be visually displayed via the display device.

20 Claims, 7 Drawing Sheets

DIGITAL ITEM PROCESSING FOR VIDEO STREAMS

BACKGROUND

A large and growing population of users enjoy entertainment through the consumption of digital video content items, such as pre-recorded video streams, live video streams, video file execution, and other types of video content. Many people today consume video content through a wide variety of electronic devices. Among these electronic devices are television sets, cellular telephones, portable media players, personal computing devices (PCDs), tablet computing devices, laptop computers, and the like. These electronic devices may be utilized in different ways depending on characteristics of the environment in which the electronic devices are disposed.

Homes and other user premises are increasingly equipped with always-on Internet or "cloud" connectivity. The constant, or nearly constant, availability of wide area network communications, in combination with increasing capabilities of computing devices—including smart TVs and hands-free, speech interface devices—have created a number of new possibilities for services that use different types of technology with in-home connected devices. For example, various cloud-based services (e.g., video streaming, voice-control, etc.) may be accessible to users through various devices including display devices and in-home speech interface devices. However, as these devices become more prevalent, difficulties in implementing capabilities to achieve growing expectations often arise. Technological advancements that are required for meeting these capabilities become increasingly involved and complex.

Described herein are improvements in technology and solutions to technical problems that can be used to, among other things, improve the use of electronic devices.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
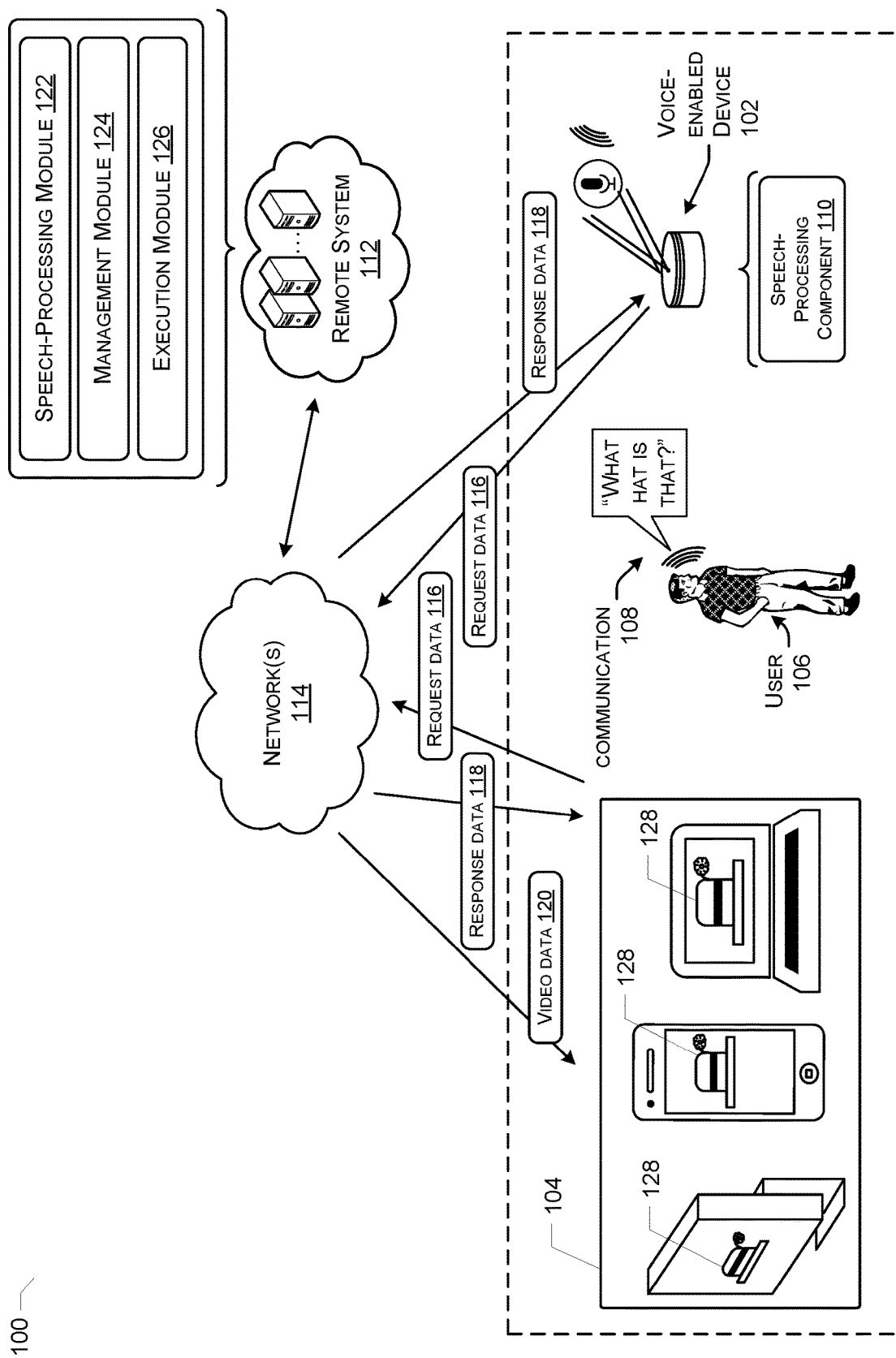
FIG. 1 illustrates a schematic diagram of an example environment in which a voice-enabled device generates audio data based on communication input associated with video presented by a display device.

The systems and processes described herein facilitate the processing of video streams and communication associated with digital items depicted in, visually displayed in, or audially output in association with the video streams. In some examples, a service provider may determine and store data associated with a candidate object represented in the video stream. The data may include a tag associated with the candidate object. The tag may include a stream identifier associated with a frame of the video stream. The tag may include a timestamp associated with a time in which the representation is visually depicted within the video stream. The data stored by the service provider may include an object identifier associated with the candidate object. The service provider may store supplemental information associated with the candidate object. In some examples, the service provider may receive a request associated with a video stream. The service provider may transmit digital video data associated with the video stream. In some examples, the service provider may receive a request associated with an item in the video stream, while the video stream is being output by a digital device. The service provider may determine the item request is associated with the candidate object based on a time in which the item request is received. The service provider may compare the time in which the item request is received to the time associated with the timestamp. The time in which the item request is received may be utilized to determine a timestamp associated with the item request. The service provider may cause the object identifier or the supplemental information to be visually displayed by the display device, or audibly output by the display device or a different device (e.g., a voice-controlled device).

The data associated with the candidate object may be determined by processing the video stream. In some examples, processing of the video stream may be performed by a machine learning (ML) model. Processing of the video stream may include one or more of pre-processing, re-processing, and real-time processing of the video stream. Processing of the video stream may include determining the candidate object, and possibly other candidate objects, are represented in the video stream. Processing of the video stream may further include determining the tag, the object identifier, and the supplemental information. The supplemental information may include one or more dimensions (e.g., characteristic(s)) associated with the candidate object. The supplemental information may be determined based on analysis of external information (e.g., product catalogs, product databases, product guides, product reviews, etc.). The supplemental information may be determined based on information associated with a variety of sources (e.g., online retail stores, brick and mortar retail stores, etc.).

The requests may be received by the service provider at different times with respect to output of the video stream. The request received before output of the video stream may be utilized to transmit the video stream to the display device. In some examples, the request associated with the item may be received from the display device. The request associated with the item in the video stream may be received during output of the video stream. The request associated with the item in the video stream may be utilized to determine information associated with the item. In some examples, the request associated with the item may be received from a voice-controlled device.

The item request may be one of a variety of requests for different types of functions. In some examples, the item request may be a request for information associated with the item. In some examples, the item request may be a request for a purchase of the item. The item request may be processed based on a time associated with the item request.

The time may be determined as a time in which the item request is received, or a time associated with information included in the item request. A response to the item request may be transmitted to the voice-controlled device and/or the display device that is presenting the video stream for audible and/or visual output. The response may include information associated with the candidate object, based on determining the item is associated with the candidate object. The item may be determined to be associated with the candidate object based on the request time matching the time associated with the timestamp. The item may be determined to be associated with the candidate object further based on a stream identifier associated with the matching the stream identifier associated with the candidate object. The object identifier may be determined to be associated with the item, based on determining that the item is associated with the candidate object. In some examples, the response may include the object identifier or the supplemental information. The response may be utilized to cause the object identifier or the supplemental information to be displayed by the display device.

Thus, the techniques described herein provide various technical advantages for display devices and voice-enabled devices. For instance, some devices may lack functionality for generating requests utilized to receive results associated with items visually depicted in video streams and/or audibly output via the video streams. In some instances, capabilities of some devices may not include transmission of information by the voice-enabled devices to receive information about items in the video streams by the display devices. The techniques described herein include coordinating information received from a voice-enabled device and information received from a display device. The voice-enabled device information may be transmitted and utilized to receive results based on the display device information, which the display device outputs a video stream. The results may be received by the display device while the video stream is being output. The results may include information associated with an item in the video stream. The results may be utilized by the display device to output the item information. The item information may include the object identifier or the supplemental information. By pre-processing the video stream, the item information may be received with a shorter delay. The pre-processing may be utilized to obtain the item information with greater accuracy, thereby avoiding numerous intermediary communications that would have otherwise resulted in increased network congestion. Network bandwidth and processing resources may be preserved by reducing overall levels of signals being processed. Accurate identification of the item in the video stream may reduce memory resources that would otherwise be required to store inaccurate information.

The techniques described herein are generally applicable to many different technologies and embodiments. For instance, while the technologies are described with respect to communication being performed by a voice-controlled device or a display device, the techniques are equally applicable to communication being performed by any type of device that is network compatible. The techniques may be implemented similarly for other types of devices that utilize non-audible communication instead of audible communication. In some instances, while the techniques are described with respect to communication being performed while the video stream is output by the display device, the techniques are equally applicable to communication being performed at any time with respect to the video stream being output by the display device.

The methods, apparatuses, and systems described herein can be implemented in a number of ways. References are made to the accompanying drawings that form a part hereof, and in which are shown by way of illustration specific configurations or examples, in which like numerals represent like elements throughout the several figures.

FIG. 1 illustrates a schematic diagram of an example environment 100 in which a voice-enabled device 102 (also referred to herein as a "voice-controlled device") generates audio data based on communication input associated with video presented by a display device 104 (e.g., a television, a mobile device, a laptop, etc.). Generally, the environment 100 may include any type of physical location in which a user 106 interacts with various devices, such as the voice-enabled device 102 and/or the display device 104. The physical location may include one or more rooms, with the voice-enabled device 102 in a same room as, or a different room than, the display device 104. As shown, the user 106 would like to control, or receive information from, the voice-enabled device 102 and/or the display device 104 by issuing a communication 108. The communication 108 may be an audible communication, a non-audible communication, or a combination of an audible communication and a non-audible communication. In some examples, the communication 108 may include one or more utterances, one or more touch inputs, and/or one or more button activations/presses. The communication 108 may be associated with, and/or determined as, communication input to the voice-enabled device 102, the display device 104. Additionally or alternatively, the communication 108 may be associated with, and/or determined as, communication input to any device (e.g., a remote control device, a tablet device, a cellular device (e.g., a mobile telephone), or another computing devices of any type) associated with, and/or in communication with, the voice-enabled device 102, the display device 104, and/or the remote system 112.

In a case in which the communication 108 is an audible communication, the communication 108 may be processed utilizing a speech processing component (e.g., a speech processing component 110) of the voice-enabled device 102 and/or a speech processing component (not shown) of the display device 104. Any of the speech-processing components (e.g., the speech processing component 110 and/or the speech processing component of the display device 104) may be utilized to process (e.g., automated speech recognition (ASR), natural language processing (NLP), etc.) the communication 108. Additionally or alternatively, speech processing of the communication 108 may be performed by one or more servers (e.g., the remote system 112) that are remote from the voice-enabled device 102 and/or the display device 104.

In some examples, the communication 108 may be associated with, and/or include, an inquiry. In other examples, the communication 108 may be associated with, and/or include, a command. In a case in which the communication 108 is an audible communication, a natural language may be spoken by the user 106 as the communication 108, such as "What hat is that?". The communication 108 by the user may be within a reception range of the voice-enabled device 102 and/or the display device 104. The reception range may be less than, or greater than, a range at which another user (e.g., a user at a same location as the device to which the audible communication is input) is able to hear and/or understand the communication 108. The display device 104 may be completely visible, partially visible, or not visible, from a location of the voice-enabled device 102. The voice-enabled device 102 may be completely visible, partially visible, or not visible, from a location of the display device 104.

As illustrated, the environment 100 may include the user 106 along with the voice-enabled device 102, the display device 104, or both the voice-enabled device 102 and the display device 104. The voice-enabled device 102 may be a standalone and/or single-purpose voice-enabled device, a handheld device, or other mobile device, such as a smartphone, a tablet computer, a media player, a personal computer, a wearable device, any of various types of accessories, and so forth. The display device 104 may be a handheld device, or other mobile device, such as a smartphone, a tablet computer, a media player, a personal computer, a TV, a wearable device, any of various types of accessories, and so forth. For the purposes of this discussion, the voice-enabled device 102 is configured to capture audio data (e.g., a voice command audibly uttered by a user) via one or more speakers, process the audio data (possibly in combination with one or more remote servers), or transmit the audio data to the remote server(s), and then output data in response to the previously captured audio data. The outputted data may be audio data output via one or more speakers of the voice-enabled device 102 or visual data output via one or more displays of the voice-enabled device 102.

The voice-enabled device 102 and/or the display device 104 may receive or capture sound corresponding to the communication 108 of the user 106. The communication 108 may be received or captured by one or more microphones of the voice-enabled device 102 and/or one or more microphones of the display device 104. In certain implementations, the communication 108 may include or be preceded by a wakeword or other trigger expression or event that is spoken by the user 106. The wakeword may be utilized to indicate to the voice-enabled device 102 and/or the display device 104 that subsequent user speech is intended to be received and acted upon by the voice-enabled device 102, the display device 104, and/or a remote system 112. The speech-processing component 110 residing on the voice-enabled device 102, the speech-processing component residing in the display device 104, and/or the remote system 112 may process the communication 108. Additionally or alternatively, the voice-enabled device 102 and/or the display device 104 may send, to one or more networks 114, request data 116 representing the communication 108 to be further processed by the remote system 112. The request data 116 may include data of any type (e.g., audio data, visual data, etc.). Any portion (e.g., a complete portion or a partial portion) of the request data 116 may be transmitted by one or both of the voice-enabled device 102 and the display device 104. The portion of the request data 116 transmitted by the voice-enabled device 102 may be the same or different as the portion of the request data 116 transmitted by the display device 104.

In some examples, the request data 116 may be sent based on the speech-processing component of the display device 104 and/or the speech-processing component 110 determining that the communication 108 may be processed more quickly and/or efficiently by the remote system 112. In other examples, the request data 116 may be sent based on the speech-processing component of the display device 104 and/or the speech-processing component 110 determining that it is unable to processes the communication 108. The request data 116 may indicate, or be associated with, the communication. The communication 108 may be processed, individually or in combination, by one or more of the speech-processing component of the display device 104, the speech-processing component 110, and the remote system 112. Processing of the communication 108 may be utilized to determine response data (e.g., response data 118) indicating, or associated with, a response to the communication 108. In the case of the remote system 112 processing some or all of the communication 108 (e.g., the request data 116), the remote system 112 may transmit any portion (e.g., a complete portion or a partial portion) of response data 118 to one or both of the voice-enabled device 102 and the display device 104. The portion of the response data 118 received by the voice-enabled device 102 may be the same or different as the portion of the response data 118 received by the display device 104. The response data 118 may be associated with, and/or determined as, the response to the communication 108.

In some examples, the display device 104 may process video data 120 (e.g., television shows, movies, documentaries, etc.) received from the network(s) 114 and/or video data stored on the display device 104. The video data 120 may be associated with a video stream associated with the video presented by the display device 104. The video data 120 may be utilized by the display device 104 to output the video stream. Output of the video stream may begin prior to the communication 108. A portion of the video stream may be output at a same time as the communication 108 is being received by the voice-enabled device 102. The communication 108 may be associated with the video data 120. The communication 108 may be received and processed while the video stream is being output. Thus, the voice-enabled device 102 and/or the display device 104 may begin the process of sending the request data 116, at different latencies, representing the communication 108 to the remote system 112 over one or more networks 114. The request data 116 may be sent for the remote system 112 to process and determine the response data 118 for the communication 108. Although the display device 104 processes the video data 120 as discussed in this disclosure, it is not limited as such. Any type of video data, including video data stored on the display device 104 (e.g., data in an executable video file utilized to output video by the display device 104), may be processed and utilized in a similar way as for the video data 120, as discussed throughout this disclosure. Video data with which the communication 108 is associated may include any video data output by any device (e.g., the voice-enabled device 102) in the environment 100 of the user 106.

As shown in FIG. 1, the remote system 112 may generally refer to a network-accessible platform—or "cloud-based service"—implemented as a computing infrastructure of processors, storage, software, data access, and so forth that is maintained and accessible via the network(s) 114, such as the Internet and/or a cellular network. The remote system 112 may be implemented as one or more computing devices including one or more servers, desktop computers, laptop computers, or the like. In one example, the remote system 112 is configured in a server cluster, server farm, data center, mainframe, cloud computing environment, or a combination thereof. To illustrate, the remote system 112 may include any number of devices that operate as a distributed computing resource (e.g., cloud computing, hosted computing, etc.) that provides services, such as storage, computing, networking, and so on. Thus, the remote system 112 is generally implemented as network-accessible resources. These resources comprise one or more processors and computer-readable storage media executable on the processors. The computer-readable media may store various components, such as a speech-processing module 122, a management module 124, and an execution module 126.

The remote system 112 may receive the request data 116, via the network(s) 114. The remote system 112 may process the request data 116 and determine a response to the request data 116. In response to audio data being received as the request data 116, or to the request data 116 including audio data, the speech-processing module 122 may begin performing speech-processing techniques on the audio data. For example, the management module 124 of the remote system 112 may call an automated speech recognition (ASR) component of the speech-processing module 122 to process the audio data using automated speech recognition to generate text data representing the utterance from which one or more user voice commands may be identified. Further, the management module 124 may call a natural language understanding (NLU) component of the speech-processing module 122 to process the text data representing the communication 108 using natural language understanding to determine an intent (e.g., intent data) expressed by the user 106 in the communication 108. For example, if the user 106 issued an inquiry of "What hat is that?", the NLU component may determine that the user's intent is to receive information associated with an item 128 (e.g., a hat). The information may be provided based on the management module 124 determining a candidate object associated with the item 128, based on the item 128 being displayed by the display device 104. The information associated with the item 128 may include information associated with the candidate object. In another example, if the user 106 issued a command to "Purchase that hat!", the NLU component may determine that the user's intent is to have a transaction for a purchase of the item 128 performed. The transaction may be performed based on the management module 124 determining the item 128, based on the item 128 being displayed by the display device 104.

Once the speech-processing module 122 has identified the intent of the communication 108 of the user 106, the management module 124 may provide an indication of the intent to the execution module 126. The execution module 126 may use the intent to determine a response indicating a result of processing the communication 108. For instance, the execution module 126 may work in conjunction with one or more speechlets that are configured to determine the response associated with the communication 108, determine locations of relevant information for servicing a request from the user 106 (e.g., network-based addresses at which the requested music audio data is stored), and/or generate and store the information if it is not already created, as well as route the identified intent to the appropriate destination execution module. The destination execution module may be determined based on the intent determined using the NLU. For example, if the NLU output includes an inquiry for information associated with item 128, the destination execution module may be an object identification application configured to determine an object identifier and/or supplemental information associated with the item 128. In other example, if the NLU output includes a command to purchase the item 128, the destination execution module may be a purchase transaction application configured to execute a purchase transaction for the item 128.

The remote system 112 may determine, as the response data 118, the response based on the request data 116. The response data 118 may include data of any type (e.g., audio data, visual data, etc.). The response data 118 may include the same type of data as, or a different type of data than, the request data 116. The response data 118 may be determined as a response to the communication 108. The remote system 112 may send the response data, as the response data 118, to the voice-enabled device 102 and/or the display device 104. The remote system 112 may transmit the response data 118 to the voice-enabled device 102 and/or the display device 104.

The voice-enabled device 102 and/or display device 104 may then perform the response indicated in the response data 118, which may include outputting video (e.g., a command, a text response, etc.) associated with video data included in the response data 118. The video output associated with the response data 118 may include the object identifier and/or the supplemental information associated with the item 128. In some examples, a list of object identifiers may be output by the voice-enabled device 102 and/or the display device 104, with each object identifier being associated with a candidate object. Additionally or alternatively to outputting the video, the voice-enabled device 102 and/or the display device 104 may output audio (e.g., a command, a text-to-speech (TTS) response, etc.) associated with audio data being included in the response data 118. The audio output associated with the response data 118 may include the object identifier and/or the supplemental information associated with the item 128. Outputting the audio may include outputting a TTS response using a loudspeaker, cause another device in the environment 100 to perform an operation, and/or any other response/action/operation.

In some examples, the remote system 112 may determine video data as the response data 118 based on the request data 116 including video data. The video data may be determined as the response data 118 further based on the request data 116 being received from a device with a video component but not an audio component.

In some examples, the remote system 112 may determine audio data as the response data 118 based on the request data 116 including audio data. The audio data may be determined as the response data 118 further based on the request data 116 being received from a device with an audio component but not a video component.

In some examples, the response data may be video data 120 being received to process a video stream associated with on-demand video or a video stream associated with a live broadcast video. The response data 118 associated with the video data 120 being associated with the on-demand video may be determined by using a machine-learning (ML) model to analyze the video data 120 prior to the on-demand video being output. The response data 118 associated with the video data 120 being associated with the live broadcast video may be determined by using an ML model to analyze the video data during the live broadcast video.

In some examples, the response data 118 may be determined based on an application that receives data captured by a camera of a device. The data captured by the camera may be associated with video being output by another device. The response data 118 associated with the video output by the other device may be determined in a similar way as for the live broadcast video.

The various devices described herein may be configured to send and receive data over various types of networks. For instance, the devices may be configured to send and receive data over wireless wide area networks (WWANs), such as 3G networks, 4G networks, 4G LTE networks, and so forth. While illustrated as being a WAN network 114, the network 114 may alternatively be any other type of network configured to send and receive data between computing devices, such as Personal Area Networks (PANs), Local Area Networks (LANs), Campus Area Networks (CANs), Metropolitan Area Networks (MANs), Broadband Global Area Networks (BGANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. In some examples, the devices may send data over the WAN network 114 using one or more network relay points (e.g., cellular network towers) depending on the distance over which the data must travel. The WAN network 114 may represent an array of wired networks, wireless networks (e.g., WiFi), or combinations thereof. Generally, the voice-enabled device 102 and the display device 104 may be configured to establish any type of connection with the remote system 112.

As a hypothetical example, a user may decide to watch a movie and provide input to play the movie via a television of the user. The user may view the movie and see an object in the movie that the he/she is curious about. The object (e.g., candidate object) could be an item (e.g., a hat, a piece of furniture, a glass/plate, an electronics device, a color, a song/piece of music, etc.). The user may issue some type of input indicating that he/she wants more information about the item (e.g., voice command/request received by voice-enabled device or display device, touch input received by display device, remote control input, etc.). A remote system may receive the input and identify the object/item based on a timestamp associated with a frame of the movie, object identifiers, etc., stored in the database. The movie may be pre-processed by the remote system so the remote system knows which objects/items are in different scenes/frames of the movie. The remote system may retrieve information about the object/item from the database. The remote system may cause the retrieved information to be presented to the user, via the display device (audio/video) and/or the voice-enabled device (audio/video).

Figure 2:
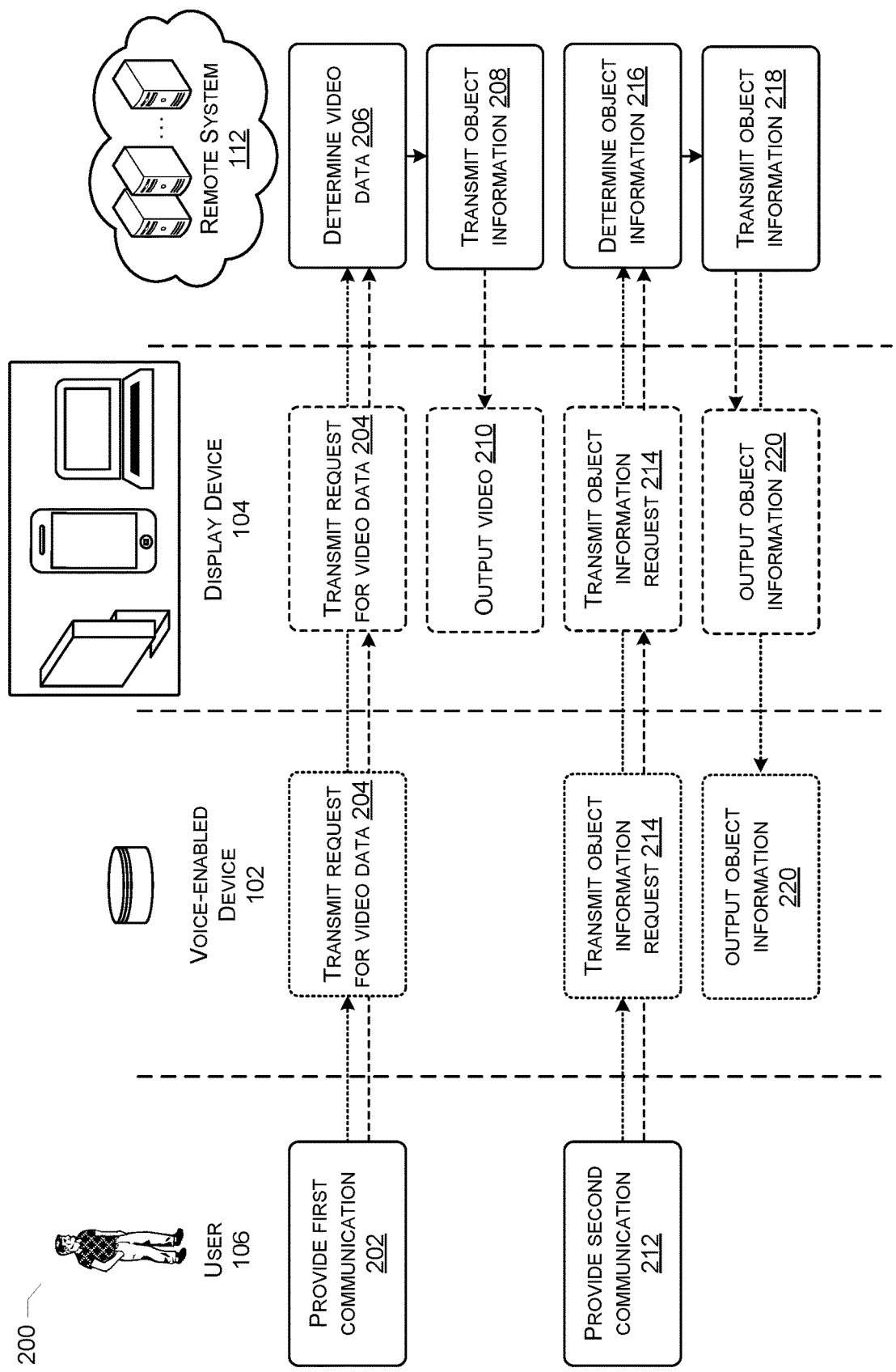
FIG. 2 illustrates a sequence diagram of example processes for processing video streams and requests associated with digital items in the video streams.

FIG. 2 illustrates a sequence diagram 200 of example processes for processing video streams and requests associated with digital items in the video streams. While the sequence diagram depicts the performance of operations and/or the transmission of certain data in a sequential manner, the operations may be performed in a different order than the order depicted in FIG. 2 and/or at least a portion of the operations may be performed in parallel.

At block 202, the user 106 may provide a communication (e.g., a first communication). The first communication may be provided by the user 106 via input to the voice-enabled device 102, the display device 104, a control device (e.g., a remote controller) associated with the voice-enabled device 102, and/or a control device (e.g., a remote controller) associated with the display device 104. Any type of input (e.g., a voice input, a physical input (e.g., one or more touches, one or more button presses, etc.)) may be utilized and/or processed as the first communication. In some embodiments, the user 106 may audibly output a voice command that is received by the voice-enabled device 102 and/or the display device 104.

At block 204, the voice-enabled device 102 and/or the display device 104 may transmit a request for video data. The request may be transmitted based on the first communication. The request may be transmitted to the remote system 112. The first communication may be utilized to determine the request, and to transmit the request based on the first communication being associated with video to be output by the voice-enabled device 102 and/or the display device 104. The information may be associated with, and/or identify, the video and/or a video stream to be utilized to output the video. The information may include one or more of a name of the video (e.g., a movie name, a series episode name, etc.), an identifier of the video (e.g., a movie identification number, a series episode identification number, etc.), an identifier of the video stream (e.g., an identification number of a video stream associated with the movie, an identification number of a video stream associated with the series episode), an identifier (e.g., a scene identifier) of a scene in the movie/episode, an identifier (e.g., a frame identifier) of a frame in the video, one or more characteristics of the video (e.g., a version identifier, one or more names cast or crew associated with the movie), and/or characteristics of the video stream (e.g., a streaming quality (e.g., high definition (HD), ultra high definition (UHD), etc.), a selection to download the video stream, a selection to play the video stream, etc.).

Although the first communication output as a single communication and the request output as a single request are discussed in this disclosure, it is not limited as such. Any number of one or more communications may be processed similarly as for the first communication. Any number of and/or one or more requests may be processed similarly as for the request. For example, any of the communication(s) and/or the request(s) may include any portion of the information associated with the video and/or the video stream. Moreover, any number of responses may be received from the remote system and output by the display device based on any of the requests, and utilized by the user to determine subsequent communications (e.g., any other of the communication(s) utilized to transmit a corresponding request, which may include any portion of the information associated with the video and/or the video stream). In some examples, the first communication may be a communication associated with the input to play the movie, as discussed in the hypothetical example in FIG. 1.

At block 206, the remote system 112 may determine video data (e.g., the video data 120). The video data 120 may be determined based on the request received from the voice-enabled device 102 and/or the display device 104. The video data 120 may be determined further based on the information associated with the video stream and/or the video associated with the video stream.

At block 208, the remote system 112 may transmit the video data 120. The video data 120 may be transmitted to the display device 104.

At block 210, the display device 104 may output video associated with the video data 120. In some examples, the voice-enabled device 102 may include a display component (not shown) that outputs video associated with the video data 120. The video may be output as a video stream by processing the video data 120 in real-time, or in near real-time based on buffering of the video data 120. In some examples, the video being output may be the movie requested by the user, as discussed in the hypothetical example in FIG. 1.

At block 212, the user 106 may provide (e.g., output) a communication (e.g., a second communication (e.g., the communication 108)). The communication 108 may be output by the user 106 in a receiving range of the voice-enabled device 102 and/or the display device 104. As discussed herein, the second communication may be audible in nature and may be captured by the voice-enabled device 102 and/or the display device 104, but the second communication may also be another type of input received from the user 106. For instance, the second communication may be a touch input from the user via a display of the voice-enabled device 102 and/or a display of the display device 104 that is outputting the video, or via another device (e.g., a mobile telephone, the voice-enabled device 102, etc.). In other embodiments, the second communication may be an input from the user 106 via a remote control or any other device (e.g., an mobile application residing on a mobile telephone or tablet device) that is used to control the voice-enabled device 102 and/or the display device 104. In some examples, the second communication may be a communication based on the input issued by the user indicating that the user wants more information about the item, as discussed in the hypothetical example in FIG. 1.

At block 214, the voice-enabled device 102 and/or the display device 104 may transmit an object information request. The object information request may include the request data 116, or other data that represents the second communication from the user 106. The object information request may be transmitted based on the communication 108 being received and/or captured by the voice-enabled device 102 and/or the display device 104. The object information request may be transmitted while the video stream is being processed (e.g., output) by the voice-enabled device 102 and/or the display device 104.

At block 216, the remote system 112 may determine object information. The object information may be determined based on the object information request. The object information may be determined further based on the request data 116. The request data 116 may include any type of data (e.g., non-audio data, audio data, etc.). In some examples, the request data 116 may include audio data that is processed by one or more of the speech-processing module 122, the management module 124, and the execution module 126. A result of the request data 116 being processed may be determined.

The object information may include any information about an item, an object, and/or a song that user has expressed interest in. The user may express interest in the item, the object, and/or the song after viewing it in the video being output. In some examples, the user may express interest in a movie or a show that characters in the video being output are watching (e.g., the characters in the video may be in near a device in the video and watching video output by the device). The user may express interest by describing, identifying, and/or indicating the object information. In some examples, the user may express interest via the communication 108 discussed in FIG. 1. In some examples, the video being output may be the movie, as discussed in the hypothetical example in FIG. 1. In some examples, an "item" may refer to a representation of a physical object or any dimension(s) of the item and/or physical object. However, the terms "item" and "object" as discussed throughout this disclosure are utilized for convenience of explanation. Any portions of this disclosure discussing "item(s)" may be interpreted similarly for "object(s)," and vice versa.

In some examples, the object information may include dimension(s) (e.g., characteristic(s)) about the item/object. The dimension(s) may include one or more of a name, a color, a shape, a material, a size, etc. In some examples, the object information may include a location (e.g., an environment, a portion of the environment (e.g., a building, a room, another object, etc.) associated with the item in the video. In some examples, the object information may include information indicating a relationship between the item and one or more other items in the video.

In some examples, any of the object information may be indicated by the user in the input to request more information about the item, as discussed in the hypothetical example in FIG. 1. The input may include a verbal inquiry, such as via verbal input associated with communication by the user of "What is the item on the desk?", "What is the red item next to the door?", "What is the round item in the center of the room?", "What is the item in the shaded area?", "What is the item in the sunlight?", etc. The input may indicate the user wishes to purchase, or obtain information for purchasing, the object associated with the item in the video, such as via verbal input associated with communication by the user of "How much is the chair?", "Where can I buy the song?", "How long would it take to ship the hat?", "Who sings the song?", "What album is the song on?", "What are other products for sale that are similar to the hat?", "What are other products for sale that are the same color, size, or style as the hat?", etc.

The object information may include information (e.g., supplemental information) determined, retrieved, and/or obtained from any source (e.g., an external source/device/system (e.g., a retail store database, a database with information in a catalog, etc.)). In some examples, the supplemental information may include item information (e.g., information about a representation and/or dimension(s) of an object) that is apparent to the user. Alternatively or additionally, the supplemental information may include item information (e.g., information about a representation and/or dimension(s) of an object) that is not viewable, partially viewable, not apparent, or not easily apparent to the user viewing the video being output. Supplemental information associated with a song may include an artist, information about the artist, an album in which the song is included, a genre associated with the song, lyrics of the song, a release date of the song and/or the album, a location for where to purchase the song/album, etc. Supplemental information associated with a dimension may be a specific shade of the color. Supplemental information associated with a representation of an object (e.g., a piece of furniture) may be a brand, a make/model, buying options, a price, user reviews, etc. The information not viewable and/or not apparent to the user may be based on the item being unidentifiable due to only a small portion of the item being viewable, the lighting of the item being too low, a period of time during which the item is viewable being too small, etc.

At block 218, the remote system 112 may transmit the object information. The object information may include the result of the request data 116 being processed. Any portion (e.g., a complete portion or a partial portion) of the object information may be transmitted as any of the response data 118. Different portions of the object information may be included in the portion of the response data 118 transmitted to the voice-enabled device 102 and the portion of the response data 118 transmitted to the display device 104.

At block 220, the voice-enabled device 102 and/or the display device 104 may output the object information. The object information may be output, visually or audibly, as the response data 118. In some examples, the response data 118 may be output while the video stream is being processed. In some examples, the response data 118 may be output while the video stream is not being processed. The video stream may be paused and/or stopped. A portion (e.g., a complete portion or a partial portion) of the screen output the response data 118. In some examples, the partial portion (e.g., a first portion) may output the response data 118 while a partial portion (e.g., a second portion) outputs video associated with the video stream. In some examples, the first partial portion may output the response data 118 while the second partial portion outputs a video frame associated with the video, based on the video stream being paused or stopped. In some examples, the second partial portion may output any content associated with normal operation of the display device 104 (e.g., operation of the display device 104 based on no object information being received). In some examples, the response data 118 may be output to overlay the video associated being output, while the video stream is being processed. In some examples, the response data 118 may be output to overlay a video frame associated with the video, based on the video stream being paused or stopped. In some examples, the response data 118 may be output to overlay any content associated with normal operation of the display device 104.

In some examples, the object information may be output audibly as a communication associated with the response data 118 via one or more speakers of the voice-enabled device 102 and/or the display device 104. Alternatively, or in addition, the voice-enabled device 102 and/or the display device 104 may present the object information via one or more displays of the voice-enabled device 102 and/or the display device 104. In some examples, the communication associated with the response data 118 may be output while the video stream is being processed by the display device 104.

In some examples, the response data 118 may be output after the video ends. The response data 118 being output after the video ends allows the video to be output without interruption. The video may be output without interruption, notwithstanding the communication 108 being received, may enhance viewing enjoyment of the user. Viewing enjoyment may be enhanced, while still receiving and processing the communication 108. A result of processing the communication 108 may be output by the display device 104 after the video output ends.

Figure 3:
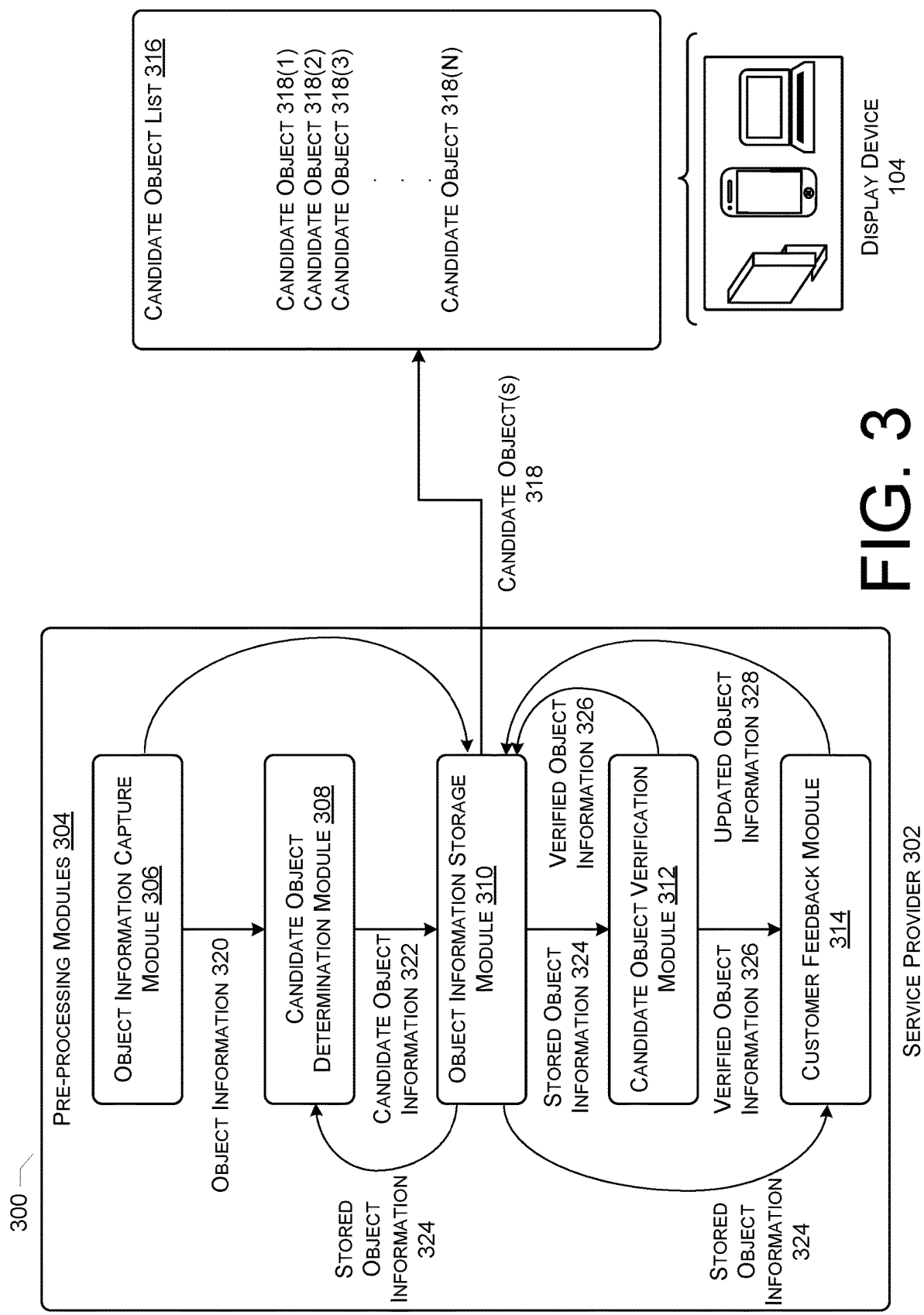
FIG. 3 is a system for processing video streams and digital items in the video streams.

FIG. 3 is a system 300 for processing video streams and digital items in the video streams. As shown in FIG. 3, the system 300 may include a service provider 302 and the display device 104 shown in FIG. 1. The service provider 302 may maintain, and/or have access to pre-processing modules 304. The pre-processing module 304 may include an object information capture module 306, a candidate object determination module 308, an object information storage module 310, a candidate object verification module 312, and a customer feedback module 314. The display device 104 may determine and display a candidate object list 316. The display device 104 may determine and/or receive one or more candidate objects 318(1), 318(2), 318(3), . . . 318(N) (collectively candidate object(s) 318). The candidate object(s) 318 may be received from the object information storage module 310 of the service provider 302. Although the object information storage module 310 transmitting the candidate object(s) 318 to the display device 104 is discussed in this disclosure, it is not limited as such. Any component (e.g., module) of the service provider 302 may transmit the candidate object(s) 318 to the display device 104, and/or to the voice-enabled device 102 shown in FIG. 1.

The service provider 302 may include and/or utilize one or more machine learning (ML) models (e.g., an ML model) to determine information based on requests received from the user 106. The service provider 302 may utilize the ML model to analyze video data and determine one or more items in video output based on the video data. The ML model may include, or operate in connection with, the pre-processing modules 304. The pre-processing modules 304 may be utilized to receive information (e.g., information in the request data 116) from the user 106. The information may be received as object information, which may be updated with information determined by the pre-processing modules 304. The updated object information may be determined based on analysis of the video data, retrieval of external information, and/or retrieval of information input from other users. By utilizing the ML model to analyze the video data, information about items that is otherwise difficult to obtain may be obtained. The ML model may process requests based on a large amount of data utilized to train the ML model. By training the ML model, information may output from the ML model based on user requests may include matching items for sale. The matching items may be determined even if the object represented in the video is no longer made, or if the video was made a long time in the past.

The pre-processing modules 304 may be utilized to pre-process one or more video streams. By utilizing the pre-processing module 304 to pre-process the video stream(s), results may be determined in real-time or near near-time. The results may be determined as the response data 118 and/or the video data 120 based on the communication 108 shown in FIG. 1. The video stream(s) may include the video stream associated with, and/or output, based on the video data 120 shown in FIG. 1. The video data 120 may include data associated with video on demand (VOD) content. Processing of the video stream may include the video data 120 being processed offline. Processing of the video data 120 offline may include the service provider 302 pre-processing the video data 120. The video data 120 may be managed by the service provider 302 along with any amount of other video data associated with one or more other video streams.

The video data 120 and the other video data may be pre-processed in prioritized fashion. The video data 120 and the other video data may be pre-processed based on a priority of the video stream associated with video data 120 and a priority of a video stream associated with each of the other video data. The priority(ies) may be determined based on a variety of one or more factors. The factor(s) may be associated with the video data 120 (e.g., the video stream associated with the video data 120) and the other video data (e.g., a video stream associated with each of the other video data). The factor(s) may include expected viewership, expected earnings, marketing agreements, vendor agreements, etc.

The object information capture module 306 may analyze the video data 120 based on one or more computer vision algorithms. Analysis performed by the object information capture module 306 may be performed as an object information capture mode. The computer vision algorithm(s) may include one or more of scene reconstruction algorithm(s), object detection algorithm(s), event detection algorithm(s), video tracking algorithm(s), object recognition algorithm(s), three dimensional (3D) pose estimation algorithm(s), learning algorithm(s), indexing algorithm(s), motion estimation algorithm(s), visual servoing algorithm(s), 3D scene modeling algorithm(s), and image restoration algorithm(s).

The computer vision algorithm(s) may determine one or more "shoppable" dimensions (e.g., characteristics) associated with any of one or more items in the video stream. In some examples, the computer vision algorithm(s) may be utilized to analyze the video data 120 by inputting the video data 120 into the ML model. The ML model may utilize the computer vision algorithm(s) to output the dimension(s) based on the video data 120. In some examples, a result of analyzing, via the computer vision algorithm(s), the video data 120 may be determined as one of the item(s) and/or one of the dimension(s) of the item. In those examples, the result may further include a timestamp at which the item occurs in the video stream, and/or a screen position of the item with which the dimension is associated. Each of the dimension(s) may include any characteristic of the item(s), such as a type, a color, a style (e.g., a fashion style), etc. The result of the object information capture module 306 may be determined as object information 320.

The candidate object determination module 308 may determine the candidate objects(s) 318. The determination by the candidate object determination module 308 may be performed as a candidate object determination mode. Each of the candidate object(s) 318 may be determined based on at least one of the item(s). In some examples, the ML model may output the candidate object(s) 318, based on the video data 120 input into the ML model. The candidate object determination module 308 may include processors (e.g., refinement processors) associated with any of the computer vision algorithm(s). Two or more of the item(s) may be utilized to determine one of the candidate object(s) 318, based on determining all of the two or more items are the same (e.g., a same item associated with one or more of different perspectives of the item, different portions of the video stream, different scenes of the movie, different video streams associated with the same movie, etc.).

Each of the candidate object(s) 318 may be determined to be associated with any of the item(s) of the video stream(s) based on external data. In some examples, the ML model may determine the candidate object(s) 318 to be associated with the item(s) based on the video data 120 input, along with external data, into the ML model. The external data may include data associated with one or more of a retail catalog, a retail store, a blog, a book, a review write-up, a photograph, and/or any other type of publication. The external data may be electronic data (e.g., data retrieved from the Internet). Any of the candidate object(s) 318 may be determined to as an object in external data, based on determining the item of the video stream matches the object in the external data. The match may be determined based on the item of the video stream having one or more dimensions that are similar to, or the same as, corresponding dimension(s) of the object in the external data. The dimension(s) of the item of the video stream that match the object in the external data may be determined as supplemental information.

In some examples, a result of the candidate object determination module 308 may include one or more of the candidate object(s) 318. The result may include one or more scores associated with any of the candidate object(s) 318. In some examples, the ML model may determine the score(s) for the candidate object(s) 318. Each of the score(s) may be associated with a likelihood of the candidate object 318 being a match to the item, or a degree at which the candidate object 318 is similar to, and/or matches with, the item. The score(s) may be confidence levels that are associated with the likelihood of the match or that indicate a strength of the match. A score having a first value may be associated with a likelihood of the candidate object 318 being a match to the item. The score having a second value that is higher than the first value may be associated with a likelihood of the candidate object 318 being a match to the item. The score having the second value may be associated with a greater likelihood of the candidate object 318 being a match to the item than for the score having the first value. The result of the candidate object determination module 308 may be determined as candidate object information 322.

The object information storage module 310 may receive and store the result (e.g., the object information 320) of the object information capture module 306 and/or the result of the candidate object determination module 308. Receiving and storing by the object information storage module 310 may be performed as an object information storage mode. Any information stored by the object information storage module 310 may be stored in a database (also referred to herein as a "datastore"). Storing the result of the object information capture module 306 may include storing one or more of the item(s), the dimension(s), the timestamp(s), and/or the screen position(s) associated with the item(s). Storing the result of the candidate object determination module 308 may include storing one or more of the candidate object(s) 318, a relationship (e.g., a relationship information) between each of the candidate object(s) 318, and one or more of the item(s), and storing the score(s) associated with the candidate object(s) 318. The relationship information may include the candidate object 318, the tag, the object identifier, and/or the supplemental information. One or more of the object information 320 and the candidate object information 322 stored in the object information storage module 310 may be determined as stored object information 324.

In some examples, any information associated with any of the pre-processing modules 304 may be stored in the database/datastore. Any module (e.g., the object information storage module 310, or one or more other modules) may be utilized to store the information in the database. The information may be stored in the datastore/database in an organized or structured manner. For instance, the object identifiers, scene identifiers, frame identifiers, and timestamps may be mapped to one another. Mapping of the object identifiers, scene identifiers, frame identifiers, and timestamps may be included as mapping information. The object identifiers, scene identifiers, frame identifiers, and timestamps may be stored together along with the mapping information. The mapping information may be utilized to quickly and efficiently identify the candidate object(s).

In some examples, supplemental information associated with each of the items/objects associated with the video may be stored and mapped to one or more of the object identifiers, scene identifiers, frame identifiers, and timestamps. Mapping between any of the supplemental information and one or more of the object identifiers, scene identifiers, frame identifiers, and timestamps may be included in the mapping information. By combining the mapping information and the supplemental information together, any information associated with the candidate object(s) may be quickly determined, retrieved, and/or transmitted to the voice-enabled device 102 and/or the display device 104. By quickly transmitting the information associated with the candidate object(s), the user is able to obtain the information quickly and efficiently.

The candidate object verification module 312 may receive the any or all of the stored object information 324. The candidate object verification module 312 may re-process any of the object information 320 and/or any of the candidate object information 322. Re-processing by the candidate object verification module 312 may be performed as a candidate object verification mode. Re-processing may include performing again (e.g., re-perform) any processing of the object information capture module 306 and/or the candidate object determination module 308.

By re-processing the result of the object information capture module 306, the object information 320 may be determined to a greater level of accuracy. The candidate object verification mode may determine additional supplemental information describing one or more dimensions of the candidate object with a greater level of accuracy. Incidentally, the candidate object information 322 may also be determined to a greater level of accuracy by re-processing the result of the object information capture module 306, due to the object information 320 being more accurately determined. By re-processing the result of the candidate object determination module 308, the candidate object information 322 may be determined to a greater level of accuracy.

In some examples, any re-processing by the candidate object verification module 312 may be performed by secondary computer vision algorithms. The secondary computer vision algorithms may compare the candidate object(s) 318 with the timestamps and positions associated with the candidate object(s) 318. By utilizing the secondary computer vision algorithms to re-process any of the stored object information 324, the confidence level associated with any of the matches between any of the item(s) and any of the candidate object(s) 318 may be increased. A result of re-processing by the candidate object verification module 312 may be determined as verified object information 326. The verified object information 326 may be transmitted to, and stored by, the object information storage module 310. Any of the verified object information 326 may replace, in the object information storage module 310, any of the stored object information 324 associated with the verified object information 326.

The customer feedback module 314 may receive any of the stored object information 324 (e.g., one or more of the object information 320, the candidate object information 322, and the verified object information 326) from the object information storage module 310. Additionally or alternatively, the customer feedback module 314 may receive the verified object information 326 from the candidate object verification module 312.

The customer feedback module 314 may monitor customer input information. The monitoring by the customer feedback module 314 may be performed as a customer feedback module mode. The customer input information may be monitored based on customer input associated with items in video streams and with objects in external data. One or more signals may be received from any device (e.g., a display device, a voice-enabled device, etc.) based on the customer input. The signal(s) may include customer input information that is monitored based on determining the customer input information is associated with an item in a video stream. Any of the customer input information may also include a command, a request, or a comment associated with an object in external data.

In some examples, the customer input information may be utilized to determine whether one or more customers purchase, and/or express interest in, any of the objects in the external data. Any of the customer input information may be received based on input associated with a video stream being received from a device, in connection with input associated with any of the objects in the external data. The input associated with a video stream may include input associated with one or more items in the video stream. Customer input information associated with an item may further include the tag (e.g., the stream identifier and/or the timestamp) and/or the object identifier.

The customer input information may be utilized to increase the score associated with any of the candidate object(s) 318. The confidence level may be increased based on the stream identifier associated with the customer input information being the same as for the candidate object(s) 318, the timestamp associated with the customer input information being the same as for the candidate object(s) 318, and/or the object identifier associated with the customer input information being the same as for the candidate object(s) 318. The confidence level may be increased further based on the input associated with any of the objects in the external data being a positive review, a comment (e.g., a confirmation or verification) indicating the object in the external data matches the item(s) in the video stream, and/or a request to purchase the object in the external data. The confidence level may be decreased based on the input associated with any of the objects in the external data being a negative review, a comment indicating the object in the external data does not match the item(s) in the video stream, an absence of a request to purchase the object in the external data, and/or a request to purchase a different object in the external data. Any of the score(s) associated with the candidate object(s) 318 may be updated based on any changes to the confidence level.

In some examples, the request to purchase the different object in the external data may be utilized to determine the candidate object 318 associated with the item in the video stream, as the different object. The updated object information 328 may include the candidate object 318 being determined as the different object. The updated object information 328 may be utilized to replace the stored object information 324 associated with the candidate object 318. The updated object information 328 may be provided, as the stored object information 324 and by the object information storage module 310, to the candidate object determination module 308. The candidate object determination module 308 can utilize, as the candidate object information 322, the updated object information 328. The relationship information, the supplemental information, and/or any of the dimension(s) associated with the candidate object 318 may be updated based on the candidate object 318 being determined as the different object.

In some examples, the candidate object list 316 may be output, visually, as the response data 118 shown in FIG. 1. In other examples, the candidate object list 316 may be output, audibly, as the response data 118 shown in FIG. 1. In other examples, any portion (e.g., a complete portion or a partial portion) of the candidate object list 316 may be visually output as the response data 118 along with any portion (e.g., a complete portion or a partial portion) of the candidate object list 316 being audibly output as the response data 118. Audible output of the portion of the candidate object list 316 as the response data 118 may be before, during, or after, visual output of the portion of the candidate object list 316 as the response data 118.

The candidate object list 316 may include candidate object(s) 318 (e.g., hats). Each of the candidate object(s) 318 may be associated with the item in the video stream. Each of the candidate object(s) 318 may be determined by the remote system 112 based on the communication 108 being received.

In some examples, the response data 118 may be determined based on the communication 108 being associated with audio data instead of visual data (e.g., the video data 120). In those examples, the communication 108 may include information associated with audible output (e.g., dialog and/or music included in connection with, or as part of, the video associated with the video stream) of the display device 104. The response data 118 may be determined based on the audio data being analyzed in a similar way as for the visual data.

In some examples, the ML model may be trained based on video data input to the ML model and determining of one or more item(s) within the video by a user. The user may determine the item(s) in the video and one or more dimension(s) associated with the item(s). The user may determine the item(s) are associated with one or more candidate objects based on the dimension(s). The ML model may utilize training to determine the response data 118. The ML model may determine one or more rules to apply to video data input to the ML model to determine the items(s) in the video data and candidate object(s) associated with the item(s). The ML model may be trained to be utilized for performing pre-processing by the pre-processing modules 304, and/or for processing any communication (e.g., the communication 108).

As a hypothetical example, the service provider may receive a request from a device, based on some type of input from a user and to the device. The request may indicate that the user wants some type of information about an object represented in a movie that the user is watching. The request may indicate that the user wishes to purchase the object or another similar object. The request may indicate some information about the object such as name or characteristic of the object. The ML model may analyze the movie and determine information about the object such as what the object is, where the user might be able to purchase the object, how many other users have made requests about the object, whether the other users made purchases based on available information about the object, how similar objects for sale are to the object represented in the movie, etc. A response may be returned to the user with answers to the user's questions or a confirmation that the object was purchased, if requested by the user. The response returned to the user may include a list of objects that are similar to the object represented in the movie.

Figure 4:
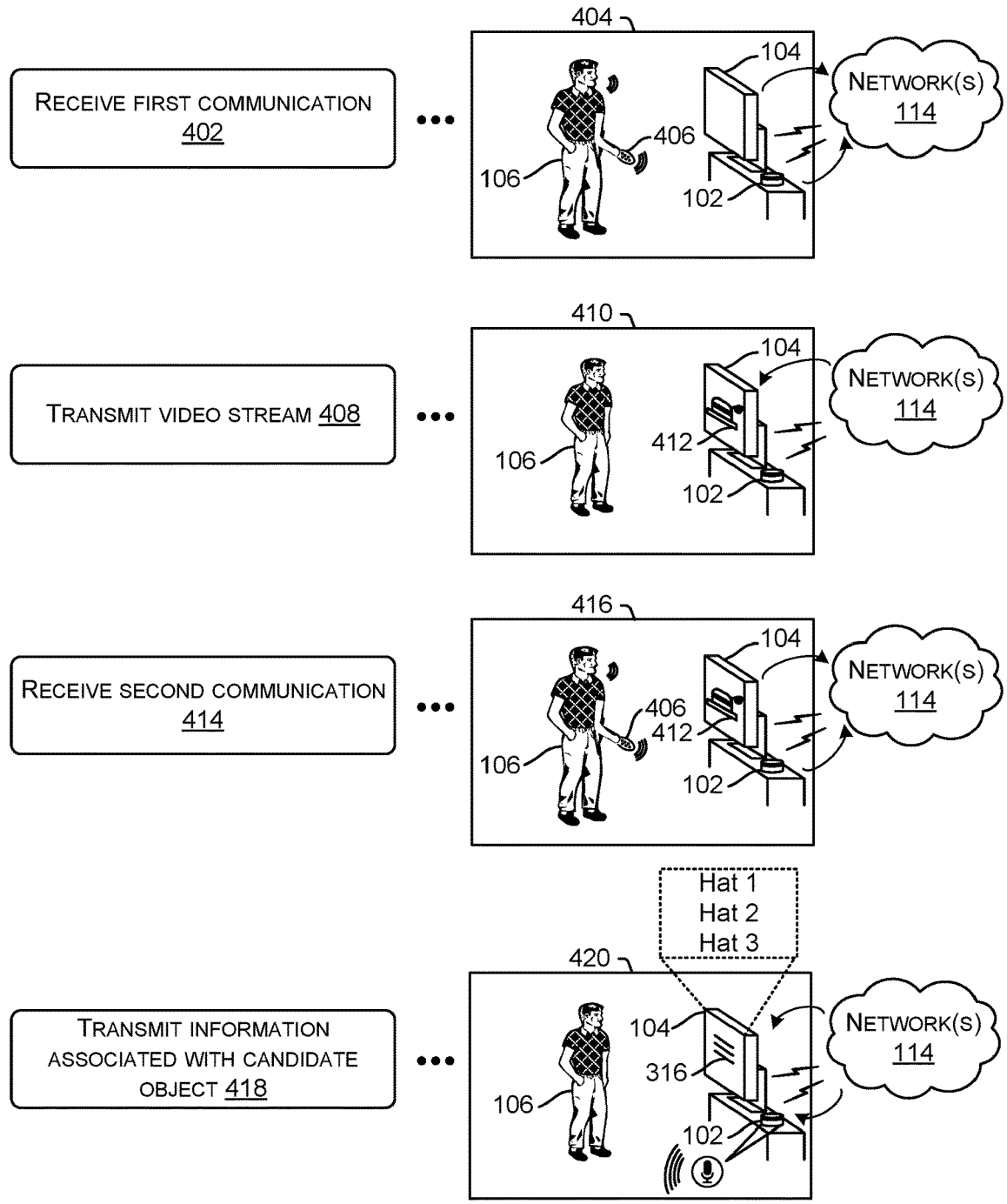
FIG. 4 is a pictorial flow diagram of an example process of processing of a video stream and a request associated with a digital item in the video stream.

FIG. 4 is a pictorial flow diagram 400 of an example process of processing of a video stream and a request associated with a digital item in the video stream.

An operation 402 may include receiving a first communication. The first communication may be a communication of any type. In some examples, the first communication may include a signal received from any of the voice-enabled device 102 or the display device 104 shown in FIG. 1. The first communication may include the signal being received from the voice-enabled device 102, based on audible input to the voice-enabled device 102. The first communication may include the signal being received from the display device 104, based on input to the display device 104 or a remote controller associated with the display device 104. The input to the display device 104 or the remote controller may include tactile input (e.g., a touch, a button press, etc.). The first communication may be received based on audible input to the display device 104. The first communication may be received based on a combination of tactile input and audible input, any of the tactile input and the audible input being to the display device 104 or the remote controller. In some examples, the tactile input (e.g., button press to a microphone activation button) may be to the remote controller, followed by the audible input to the display device 104.

In some examples, the user may wish to watch the movie as in the hypothetical example discussed above in FIG. 1. The user may issue an input, such as by operating a remote control to press a series of buttons (or via a mobile application residing on a mobile telephone or tablet computing device). Utilizing the remote control, the user may navigate through a movie guide or streaming service provided by a television. The user may control the television and input a request to begin playing a movie.

An example 404 illustrates an environment including the user 106, the voice-enabled device 102, the display device 104, and a remote controller 406. Input to one or more of the display device 104 or a remote controller 406 may be associated with the first communication being received by the network(s) 114, as shown in FIG. 1. In some examples, the input may include a tactile input to the display device 104 or the remote controller 406. In other examples, the input may include a tactile input to the remote controller 406 followed by an audible input to the display device 104. In other examples, the input may include an audible input to the voice-enabled device 102. The first communication may be received from one or more of the voice-enabled device 102 and the display device 104. The first communication may include a signal received from the voice-enabled device 102 and by the network(s) 114, based on the input to the voice-enabled device 102. The first communication may include a signal received from the display device 104 and by the network(s) 114, based on the input to the display device 104. The first communication may include a signal received from the voice-enabled device 102 and/or a signal received from the display device 104.

In some examples, the first communication may be associated with a request to receive a video stream. The video stream may be associated with on-demand video or live broadcast video.

An operation 408 may include transmitting a video stream. The video stream may be transmitted by the network(s) 114 and to the display device 104. The video stream may be transmitted based on the first communication.

In some examples, the television may being playing a movie as in the hypothetical example discussed above in FIG. 1. The movie may include a hat that is worn by one of the characters.

An example 410 illustrates the environment including the user 106, the voice-enabled device 102, and the display device 104. The display device 104 may process a video stream and output video associated with the video stream. The video may include an item 412 (e.g. a hat). The item 412 may be determined as a representation of a candidate object (e.g., one of the candidate object(s) 318, shown in FIG. 3). The candidate object 318 may be determined based on the item 412 (e.g., one or more dimensions associated with the item 412).

An operation 414 may include receiving a second communication. The second communication may be received in a similar way as for the first communication.

In some examples, the user may wish to learn about the hat in the movie, or purchase a similar hat, as in the hypothetical example discussed above in FIG. 1. The user may speak a request that is processed by the television of a nearby voice-enabled device. The user may ask for information about the hat or ask to purchase any similar hat that is available for sale.

An example 416 illustrates the environment including the display device 104 outputting the video that includes the item 412. The second communication may be received from the voice-enabled device 102 and/or the display device 104. In some examples, the second communication may include information associated with the item 412. The information associated with the item 412 may include a request for one or more details (e.g., dimensions) associated with the item 412. The information associated with the item 412 may include a request for a retail store from which the item 412 may be purchased. The information associated with the item 412 may include a command to purchase the item 412.

An operation 418 may include transmitting information associated with a candidate object (e.g., the candidate object 318). The information may be transmitted based on processing the second communication.

In some examples, the television may display a list of hats, as in the hypothetical example discussed above in FIG. 1. The list of hats may include various hats that are similar to the hat represented in the movie. The listed hats may be obtained, notwithstanding the represented hat being no longer made or the movie being very old. The list of hats may be output audibly instead of visually. Each of the hats may be listed, visually and/or audibly, in any order (e.g., alphabetically, shipping speed, availability, number of hats in stock, closeness of the hat for sale matching the hat represented in the movie, etc.).

An example 420 illustrates the environment including the display device 104 outputting a list of candidate objects (e.g., the list of candidate object(s) 316 shown in FIG. 3). The list of candidate object(s) 316 may be output, visually, by the display device 104. In some examples, the list of candidate object(s) 316 may be output, audibly, by the voice-enabled device 102. In other examples, the list of candidate object(s) 316 may be output by one or more of the voice-enabled device 102 and the display device 104, at the same time or different times. The list of candidate object(s) 316 being output by the voice-enabled device 102, the display device 104, or both the voice-enabled device 102 and the display device 104 may be automatic based on a setting (e.g., a setting associated with an account (e.g., a video streaming service account) of the user 106). The list of candidate object(s) 316 may be output by the voice-enabled device 102, the display device 104, or both the voice-enabled device 102 and the display device 104 based on the second communication (e.g., one of the devices being indicated in the second communication to output the list of candidate object(s) 316).

Figure 5:
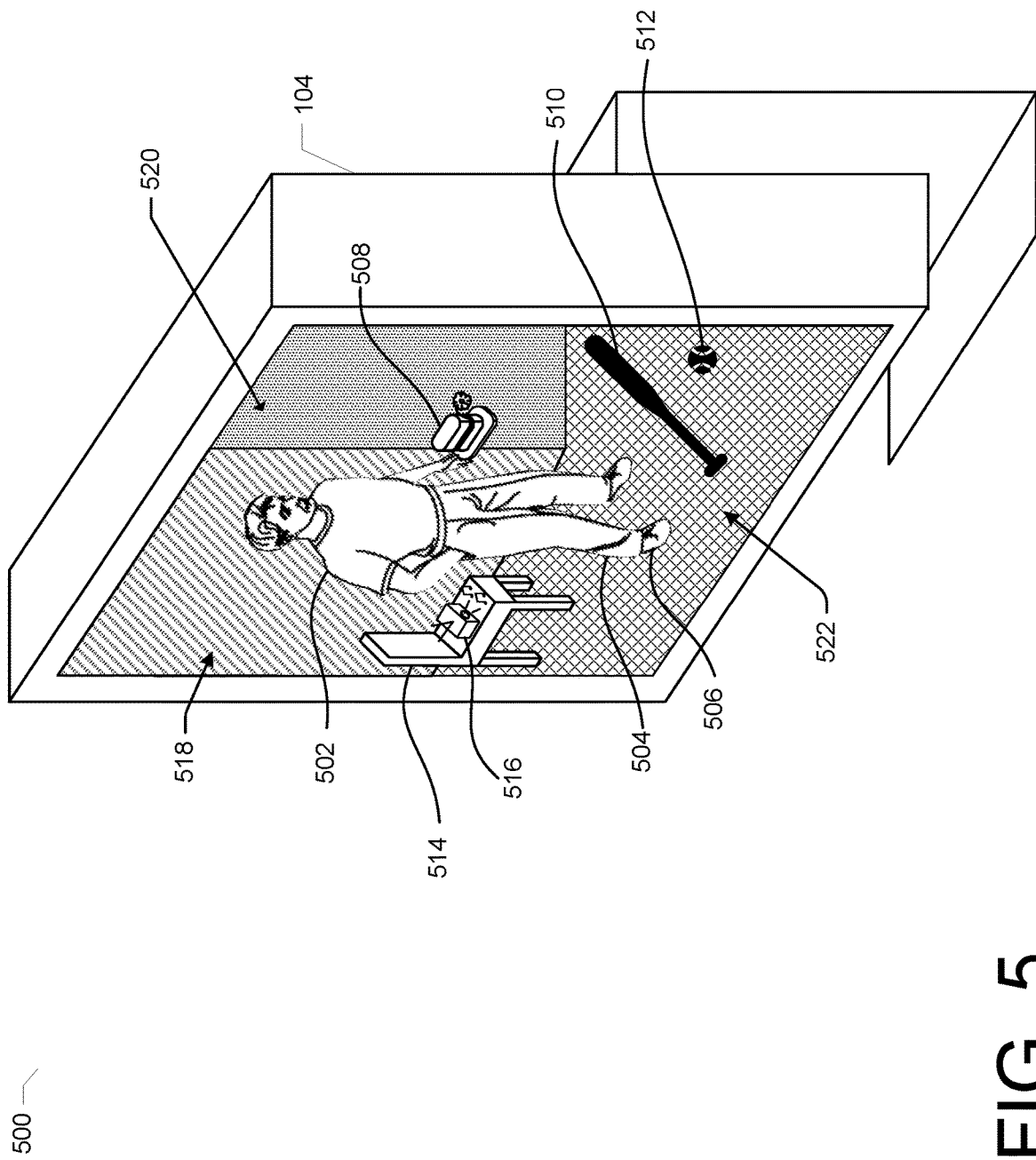
FIG. 5 is an example environment including a display device for processing a video stream with digital items.

FIG. 5 is an example environment 500 including a display device (e.g., the display device 104 shown in FIG. 1) for processing a video stream with digital items. The display device 104 may output video associated with a video stream being processed. The video may include a character with a shirt 502, pants 504, shoes 506, and a hat 508. The video may include a baseball bat 510 and a baseball 512. The video may include a chair 514 and a radio 516. The video may include a wall 518 and a wall 520, with a color and/or color pattern of the wall 520 being different from color and/or color pattern of the wall 518. The video may include a floor 522, with a color and/or color pattern being different from one or more of the color of the wall 518 and the color of the wall 520.

In some examples, a user 106 may issue the communication 108 shown in FIG. 1, based on any of the items in the display device 104. The items may include the shirt 502, the pants 504, the shoes 506, the hat 508, the baseball bat 510, the baseball 512, the chair 514, the radio 516, the wall 518, the wall 520, and the floor 522. The communication 108 may be a communication associated with one of the items or a dimension of any of the items. The communication may include information associated with a request or a command.

In some examples, the communication 108 may be associated with a type of music output by the radio 516 or music played in the background while the video is being output (or specific information about the song being output), a color of any of the items, and/a material of any of the items (e.g., cotton, suede, corduroy, marble, glass, stone, plastic, etc.), or a style of any of the items. In those examples, the communication 108 may include information associated with a request, such as "What color is the wall?", "What type of music is playing?", "What type of furniture is in the room?", "What sports equipment is next to the character?", "What type of hat is the actor wearing?", or "Purchase the hat." The communication 108 may be received by the remote system 112 and utilized to determine information to be transmitted in the response to the communication 108. The communication 108 may be utilized to provide supplemental information about the item to the user (either visually or audibly) and/or to perform a transaction associated with a purchase of any of the items (e.g., the hat 508). Although the item 128 is determined as the hat as discussed in this disclosure, it is not limited as such. Any portions of the disclosure discussed with respect to the item 128 may be implemented similarly for any item in the video.

In some examples, information associated with items that are displayed may be determined. The information may include dimension(s) (e.g., characteristic(s)) about the items. An item may include one or more of a color, a shape, a material, a size, a location (e.g., an environment, a portion of the environment (e.g., a building, a room, another object, etc.) associated with a representation of an object, a relationship between the requested item and one or more other items, a brand, a make/model, buying options, a price, user reviews, etc. Information about a song may include an artist, an album, a genre, lyrics, a release date of the song and/or the album, a location for where to purchase the song/album, etc.

In some examples, the determined information may be provided to the user based on user requests or utilized by the remote system to respond to user request. The determined information may be utilized to identify additional information from external sources, input from other users, etc. Any results determined by utilizing this information may be provided to the user audibly and/or visually.

In some examples, the display device 104 may display one or more highlight indications associated with any of the items based on the communication 108. In those examples, a highlight indication (e.g., a box centered around one of the items) may be displayed based on the communication 108 (e.g., a communication including a request of "Highlight items in the video for purchase"). In some examples, a communication (e.g., a communication based on tactile input or audible input to the display device 104, or audible input to the voice-enabled device 102) may be transmitted to the remote system 112. In those examples, the communication may be transmitted based on a selection of one of the highlight indication by a mouse click input to the display device 104 or with a remote controller of the display device 104. The communication may include information associated with a request or a commend. The request or the command may be determined by the remote system 112 to be associated with one of the items. The remote system 112 may response to the communication based on the highlight indication, in a similar way as for the communication 108.

As discussed above, the voice-enabled device 102 and/or the display device 104 may present information (e.g., information based on the video, information from external sources, information from other users, etc.) visually and/or audibly. The information may be presented while the video is playing, while the video is paused or stopped, and/or after presentation of the video is complete. The user can select any of that information or corresponding links to navigate to a website or mobile app that includes more information about any of the items. Selection of any of the items by the user allows the user to add the item to a wish list, to purchase the item, to obtain additional information about the item, etc. Selection of an item may be made by any type of input (e.g., verbal input, and/or touch input or button presses of arrows on a controller, mouse wheels, joysticks, toggle levers, or any other types of keyboard keys, mouse buttons, or controller components) of any of the displayed information (e.g., highlight indications, items in a list, etc.).

By processing the request from the user and analyzing information associated with video output by the device, the user may receive about items in the video. The user may receive information about the items (or similar items) in real-time (or near real-time). The information about the items may be provided to allow the user to learn about the items or to purchase the items. The information about the similar items may be provided instead, if identification about the specific item requested by the user is unsuccessful. The information about the similar items may be provided as an option for items might be more attractive to the user (e.g., cheaper, easier to get, better quality, etc.). Any of the information about the specific items requested by the user or about the similar items may be mapped to the specific item in the database. Mapping may include adding information about the similar items (e.g., information with dimensions/ details about the items, information identifying how to purchase the similar items, information about the advantages or disadvantages of the similar items with respect to the requested item, etc.) to the mapping information stored in the database.

Figure 6:
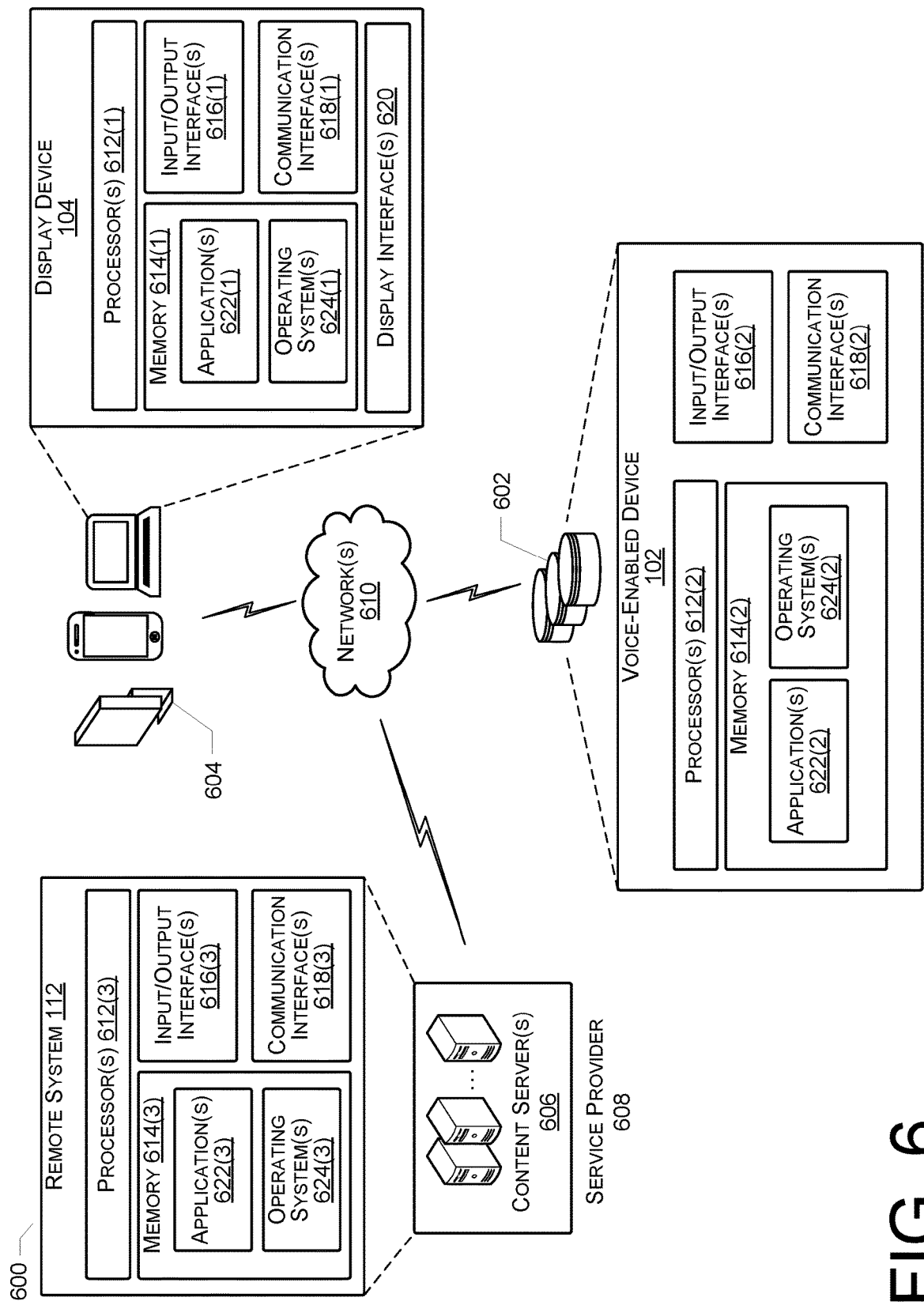
FIG. 6 is a system that includes multiple devices that coordinate the processing of video streams and requests associated with digital items in the video streams.

FIG. 6 is a system 600 that includes multiple devices that coordinate the processing of video streams and requests associated with digital items in the video streams. The devices may include one or more voice-enabled devices 602, one or more display devices 604, and one or more content servers 606.

The voice-enabled device(s) 602 may include the voice-enabled device 102 shown in FIG. 1. The display device(s) 604 may include the display device 104 shown in FIG. 13. The content server(s) 606 may be associated with a service provider 608. The content server(s) 606 may be included in, and utilized to implement any functions of, the remote system 112 shown in FIG. 1. The service provider 608 may be utilized to implement the service provider 302 shown in FIG. 3.

The voice-enabled device(s) 602, the display device(s) 604, and the content server(s) 606 may be configured to communicate with one another via one or more networks 610. The voice-enabled device(s) 602 and the display device(s) 604 may communicate with the content server(s) 606, such as to transmit requests to, and receive responses from, the content server(s) 606. The voice-enabled device(s) 602 and the display device(s) 604 may transmit any information associated with the requests to, and receive any information associated with the responses from, the content server(s) 606. The voice-enabled device(s) 602 and the display device(s) 604 may communicate between one another utilizing the network(s) 610. The voice-enabled device(s) 602 and the display device(s) 604 may communicate between one another, in a similar way as for how they communication with the content server(s) 606.

The network(s) 610 may include the Internet, cable networks, cellular networks, wireless networks (e.g., Wi-Fi) and/or wired networks, as well as close-range communications such as Bluetooth®, Bluetooth® low energy, or the like. The voice-enabled device(s) 602 and the display device(s) 604 may communicate with the content server(s) 606 utilizing different type of networks (e.g., networks with different protocols). For example, the voice-enabled device(s) 602 may utilize a first type of network to communicate with the content server(s) 606. For example, the display device(s) 604 may utilize a second type of network that is different from the first type of network to communicate with the content server(s) 606. The second type of network associated with each of the television, the mobile device, and the laptop may be unique and different from a protocol for each of the others. The network(s) 610 may include the Internet, cable networks, cellular networks, wireless networks (e.g., Wi-Fi) and/or wired networks, as well as close-range communications such as Bluetooth®, Bluetooth® low energy, or the like).

The voice-enabled device(s) 602 and the display device(s) 604 may represent, but are not limited to, televisions (TVs), cellular telephones, desktop computers, server computers or blade servers such as web-servers, map-reduce servers, or other computation engines or network-attached storage units, personal computers, mobile computers, laptop computers, tablet computers, telecommunication devices, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device coverable of sending communications and performing the functions according to the techniques described herein. Among these TVs are liquid crystal display (LCD) TVs, light emitting diode (LED) TVs, organic light emitting diode (OLED) TVs, plasma display devices (PDP) TVs, quantum dot (QLED) TVs, and electroluminescent (ELD) TVs. In some examples, the voice-enabled device(s) 602 may include devices without display components. In some examples, the display device(s) 604 may include devices without speech processing components.

In the illustrated example, the voice-enabled device(s) 602 and the display device(s) 604 configured to communicate with the content server(s) 606 include one or more processors 612(1), 612(2), and/or 612(3) (collectively processor(s) 612), at least one memory 614(1), 614(2), and/or 614(3) (collectively memory 614), one or more input/output (I/O) interfaces 616(1), 616(2), and/or 616(3) (collectively I/O interface(s) 616), and/or one or more communication (e.g., network) interfaces 618(1), 618(2), and/or 618(3) (collectively communication interface(s) 618). The display device(s) 604 may include one or more display interfaces 620.

Each processor 612 may include multiple processors and/or a processor having multiple cores. Further, the processor(s) 612 may include one or more cores of different types. For example, the processor(s) 612 may include application processor units, graphic processing units, and so forth. In various examples, the processor(s) 612 may include one or more microprocessors, microcomputers, microcontrollers, digital signal processors, central processing units, state machines, logic circuitries, and/or any devices that manipulate signals based on operational instructions. In some examples, the processor(s) 612 may include one or more hardware processors and/or logic circuits of any suitable type specifically programmed or configured to execute the algorithms and processes described herein.

For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 612 may possess its own local memory, which also may store program components, program data, and/or one or more operating systems.

In some examples, the processor(s) 612 may be configured to fetch and execute computer-readable processor-executable instructions stored in the memory 614. Depending on the configuration of the voice-enabled device(s) 602, the display device(s) 604, and the content server(s) 606, the memory 614 may be an example of tangible non-transitory computer storage media and may include volatile and non-volatile memory and/or removable and non-removable media implemented in any type of technology for storage of information such as computer-readable processor-executable instructions, data structures, program modules or other data. Such memory 614 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 614 may be implemented as computer-readable storage media ("CRSM"), which may be any available physical media accessible by the processor(s) 612 to execute instructions stored on the memory 614. In some examples, CRSM may include random access memory ("RAM") and Flash memory. In other examples, CRSM may include, but is not limited to, read-only memory ("ROM"), electrically erasable programmable read-only memory ("EEPROM"), or any other tangible medium which can be used to store the desired information, and which can be accessed by the processor(s) 612.

The memory 614 may be used to store and maintain any number of functional components that are executable by the processor 612. In some examples, these functional components include instructions or programs that are executable by the processor 612 and that, when executed, implement operational logic for performing the actions and services attributed above to the voice-enabled device(s) 602, the display device(s) 604, and the content server(s) 606. Functional components of the voice-enabled device(s) 602, the display device(s) 604, and the content server(s) 606 stored in the memory 614(1), 614(2), and/or 614(3) may include applications 622(1), 622(2), and/or 622(3) (collectively applications 622). The application(s) 622 may configure the respective devices to perform functions described herein such as with regard to FIGS. 1-5 and 7.

The functional components of the voice-enabled device(s) 602, the display device(s) 604, and the content server(s) 606 stored in the memory 614(1), 614(2), and/or 614(3) may additionally include operating systems 624(1), 624(2), and/or 624(3), respectively (collectively operating systems 624). The operating system(s) 624 for controlling and managing various functions of the voice-enabled device(s) 602, the display device(s) 604, and the content server(s) 606. The memory 614 may also store other modules and data, which may include programs, drivers, etc., and the data used or generated by the functional components, to enable efficient and effective food order processing. Further, the voice-enabled device(s) 602, the display device(s) 604, and the content server(s) 606 may include many other logical, programmatic and physical components, of which those described are merely examples that are related to the discussion herein. In addition, the memory 614 may also store data, data structures and the like, that are used by the functional components.

The I/O interface(s) 616, may include scanners (e.g., for scanning bar codes, QR codes, etc.), speakers, a microphone, a camera, and various user controls (e.g., buttons, a joystick, a keyboard, a keypad, etc.), a haptic output device, and so forth. The communication interface(s) 618 may include one or more interfaces and hardware components for enabling communication with various other devices over the network or directly.

Figure 7:
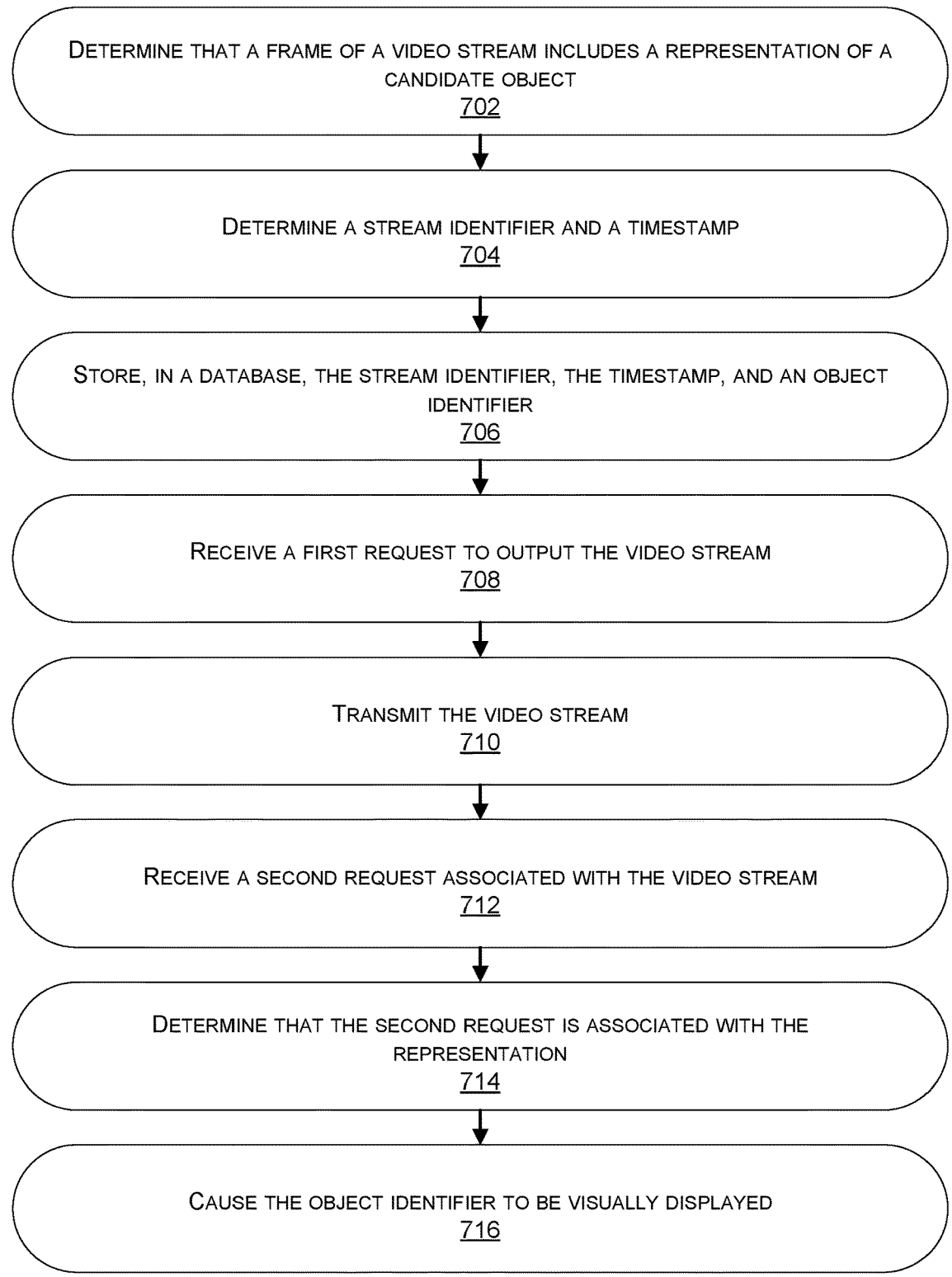
FIG. 7 is a flow diagram illustrating an example process of processing a video stream and a request associated with a digital item in the video stream.

FIG. 7 is a flow diagram illustrating an example process 700 of processing a video stream and a request associated with a digital item in the video stream At 702, a remote system may determine that a frame of a video stream includes a representation of a candidate object. The frame may be determined based on analysis of the video stream by an ML model. The ML model may perform the analysis based on ML model being trained by training associated with other video streams.

At 704, the remote system may determine a stream identifier and a timestamp. The stream identifier and the timestamp may be associated with the candidate object in the video stream. A tag associated with the video stream and the candidate object may be determined. The tag may include the stream identifier associated with the frame. The tag may include the timestamp representing a first time in which the representation is visually depicted within the video stream.

At 706, the remote system may store, in a database, the stream identifier, the timestamp, and an object identifier. The object identifier may be associated with the candidate object. The stream identifier, the timestamp, and the object identifier may be stored along with mapping information. The mapping information may be utilized to allow fast processing of user requests associated with the candidate object. By processing the requests quickly, responses may be provided audibly and/or visually, efficiently and with short delay times (e.g., latency).

At 708, the remote system may receive a first request to output the video stream. The first request may be received to output the video stream via a display device. The first request may be received from the voice-enabled device or the display device. The first request may be received based on an audible communication or a tactile communication associated with a user.

At 710, the remote system may transmit the video stream. The video stream may be transmitted to the voice-enabled device and/or the display device. The video stream may be a live video stream or an on-demand video stream. Pre-processing associated with the ML model may be utilized to determine candidate objects in the on-demand video stream, prior to transmission of the on-demand video stream.

At 712, the remote system may receive a second request associated with the video stream. The second request may be received while the video stream is being output by the display device. The second request may be received from a voice-controlled device that is within a same environment as the display device. The second request may be captured by one or more speakers of the voice-controlled device. The second request may refer to an item that is visually or audially depicted in the video stream.

At 714, the remote system may determine that the second request is associated with the representation. The second request may be determined to be associated with the representation of the candidate object, based at least in part on the stream identifier and the timestamp. The timestamp may be associated with a first time in which the representation is visually depicted within the video stream. The second request may be determined to be associated with the representation of the candidate object, based at least in part on a result of a comparison. The result may be determined by comparing a second time in which the second request was received and a corresponding time in the video stream to the first time associated with the timestamp, At 716, the remote system may cause the object identifier to be visually displayed. The object identifier may be visually displayed via the display device.

Although the term "user" is utilized throughout this disclosure, it is not limited as such and the term "user" is utilized for simplicity. The term "user" as used throughout disclosure may denote any type of user, including a user, an administrator, etc.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A system comprising:
   at least one processor; and
   at least one non-transitory computer-readable storage medium having computer-executable instructions stored thereon which, when executed on the at least one processor, cause the system to perform operations comprising:
   determining that a frame of a first media stream comprises a first representation of a candidate object;
   determining a tag associated with the first media stream and the candidate object, the tag comprising a first stream identifier associated with the first media stream, the tag comprising a timestamp representing a first time in which the first representation is depicted within the first media stream, the first representation of the candidate object being visually depicted within the first media stream;
   determining a second stream identifier associated with a second media stream, the second media stream comprising a second representation of the candidate object, the second representation of the candidate object being audibly referenced in the second media stream;
   storing, in a database, data associated with the first media stream and the second media stream, the data comprising the first stream identifier, the timestamp, an object identifier, and the second stream identifier, the object identifier being associated with the candidate object;
   determining supplemental information associated with the candidate object, based at least in part on the candidate object;
   storing, in the database, the supplemental information;
   receiving a first request to output the first media stream via a display device;
   receiving, while the first media stream is being output by the display device, and from a voice-controlled device within a same environment as the display device, a second request associated with the first media stream, the second request being a natural language request captured by one or more microphones of the voice-controlled device;
   processing the natural language request to be a natural language processed request referring to an item that is depicted in the first media stream;
   comparing a second time in which the second request was received and a corresponding time in the first media stream to the first time;
   determining that the second request is associated with the first representation of the candidate object, based at least in part on a result of the comparing the second time and the corresponding time to the first time; and
   causing at least one of the object identifier or the supplemental information to be visually displayed via the display device.

2. The system of claim 1, wherein determining the supplemental information further comprises analyzing, via a machine learning (ML) model, the first representation to identify a dimension associated with the candidate object, the dimension including a name, a color, a shape, a material, or a size of the candidate object, the dimension being utilized to determine the candidate object, the operations further comprising:
   storing the dimension in a database along with mapping information associated with the candidate object and the dimension.

3. The system of claim 1, wherein determining the supplemental information further comprises:
   performing pre-processing of the candidate object to retrieve the supplemental information from an external database, the pre-processing including an object information capture mode to utilize a computer vision algorithm to determine a dimension of the candidate object, the dimension including a name, a color, a shape, a material, or a size of the candidate object, the pre-processing further including a candidate object determination mode to determine the candidate object based on the dimension; and
   performing re-processing of the candidate object to retrieve additional supplemental information associated with the candidate object, the additional supplemental information describing a dimension of the candidate object with a greater level of accuracy, the re-processing including a candidate object verification mode to re-perform at least one of the object information capture mode or the candidate object determination mode.

4. The system of claim 1, the operations further comprising:
   receiving a third request from the voice-controlled device, the third request being associated with user input requesting a purchase of the candidate object; and
   processing a transaction associated with the purchase of the candidate object based at least in part on the third request.

5. The system of claim 1, the operations further comprising:
   receiving a third request from the voice-controlled device, the third request being associated with user input request information associated with the candidate object; and
   transmitting dimension information associated with the candidate object to the voice-controlled device, based at least in part on the third request, the dimension information including at least one of a name, a color, a shape, a material, or a size of the candidate object.

6. The system of claim 1, wherein the item is a first item, wherein:
   the natural language request identifies a second item, and a relationship between the first item and the second item; and
   a referral of the natural language request to the first item is identified based at least in part on the relationship.

7. A system comprising:
   at least one processor; and
   at least one non-transitory computer-readable storage medium having computer-executable instructions stored thereon which, when executed by the at least one processor, cause the system to perform operations comprising:

determining that a frame of a first media stream depicts a first representation of a candidate object, the first representation of the candidate object being visually depicted within the first media stream;

determining a first stream identifier associated with the first media stream, and a timestamp associated with the candidate object in the first media stream;

determining a second stream identifier associated with a second media stream, the second media stream depicting a second representation of the candidate object, the second representation of the candidate object being audibly referenced in the second media stream;

storing, in a database, the first stream identifier, the timestamp, an object identifier, and the second stream identifier, the object identifier being associated with the candidate object;

receiving, while the first media stream is being output by a first device that is a display device, and from a second device, a natural language request associated with the first media stream;

processing the natural language request to be a natural language processed request identifying an object depicted in the first media stream;

determining, based at least in part on the first stream identifier and the timestamp, that the object referred to in the natural language request corresponds to the first representation of the candidate object; and causing at least one of the object identifier or information associated with the candidate object to be visually displayed via the display device.

8. The system of claim 7, the operations further comprising:

determining a tag associated with the first media stream and the candidate object, the tag including the first stream identifier, the tag including the timestamp representing a first time in which the first representation is visually depicted within the first media stream.

9. The system of claim 7, the operations further comprising:

determining the information associated with the candidate object, based at least in part on the candidate object; and storing, in the database, the information in association with the object identifier, the first stream identifier, and the timestamp.

10. The system of claim 7, wherein the natural language request is captured by one or more microphones of the second device, the second device is a voice-controlled device, and the natural language request is transmitted from the voice-controlled device to the system.

11. The system of claim 7, wherein the timestamp represents a first time in which the first representation is visually depicted within the first media stream, the operations further comprising:

comparing a second time in which the natural language request was received and a corresponding time in the first media stream to the first time associated with the timestamp, the natural language request determined to be associated with the first representation of the candidate object, based at least in part on a result of the comparing the second time and the corresponding time to the first time.

12. The system of claim 7, the operations further comprising:

analyzing, via a machine learning (ML) model, the first representation to identify a dimension associated with the candidate object, the dimension including a name, a color, a shape, a material, or a size of the candidate object, the dimension being utilized to determine the candidate object.

13. The system of claim 7, the operations further comprising:

performing pre-processing of the candidate object to retrieve supplemental information from an external database, the pre-processing including an object information capture mode to utilize a computer vision algorithm to determine a dimension of the candidate object, the dimension including a name a color, a shape, a material, or a size of the candidate object, the pre-processing further including a candidate object determination mode to determine the candidate object based on the dimension; and performing re-processing of the candidate object to retrieve additional supplemental information associated with the candidate object, the additional supplemental information describing a dimension of the candidate object with a greater level of accuracy, the re-processing including a candidate object verification mode to re-perform at least one of the object information capture mode or the candidate object determination mode.

14. The system of claim 7, wherein the object is a first object, wherein:

the natural language request identifies a second object, and a relationship between the first object and the second object; and a referral of the natural language request to the first object is identified based at least in part on the relationship.

15. A method comprising:

determining that a frame of a first media stream includes a first representation of a candidate object, the first representation of the candidate object being visually depicted within the first media stream;

determining a first stream identifier and a timestamp associated with the candidate object depicted in the first media stream;

determining a second stream identifier associated with a second media stream, the second media stream including a second representation of the candidate object, the second representation of the candidate object being audibly referenced in the second media stream;

storing, in a database, the first stream identifier, the timestamp, an object identifier, and a second stream identifier, the object identifier being associated with the candidate object;

receiving, while the first media stream is being output by a first device that is a display device, a natural language request associated with the first media stream, the natural language request being received from the display device or a voice-controlled device that is within a same environment as the display device;

processing the natural language request to be a natural language processed request;

determining that the natural language processed request is associated with the first representation of the candidate object, based at least in part on the first stream identifier and the timestamp; and causing the object identifier to be output via at least one of the display device or the voice-controlled device.

16. The method of claim 15, further comprising:
determining a tag associated with the first media stream and the candidate object, the tag comprising the first stream identifier, the tag comprising the timestamp representing a first time in which the first representation is visually depicted within the first media stream.

17. The method of claim 15, further comprising:
determining supplemental information associated with the candidate object, based at least in part on the candidate object; and storing, in the database, the supplemental information.

18. The method of claim 15, wherein the natural language request is captured by one or more microphones of the display device or the voice-controlled device, and the natural language request refers to an item that is visually or audibly depicted in the first media stream.

19. The method of claim 15, wherein the timestamp represents a first time in which the first representation is visually depicted within the first media stream, further comprising:
comparing a second time in which the natural language request was received and a corresponding time in the first media stream to the first time associated with the timestamp, the natural language request determined to be associated with the first representation of the candidate object, based at least in part on a result of comparing the second time and the corresponding time to the first time.

20. The method of claim 15, further comprising:
performing pre-processing of the candidate object to retrieve supplemental information from an external database, the pre-processing including an object information capture mode to utilize a computer vision algorithm to determine a dimension of the candidate object, the dimension including a name a color, a shape, a material, or a size of the candidate object, the pre-processing further including a candidate object determination mode to determine the candidate object based on the dimension; and performing re-processing of the candidate object to retrieve additional supplemental information associated with the candidate object, the additional supplemental information describing a dimension of the candidate object with a greater level of accuracy, the re-processing including a candidate object verification mode to re-perform at least one of the object information capture mode or the candidate object determination mode.

\* \* \* \* \*